US007573732B2

(12) United States Patent
Teichmann et al.

(10) Patent No.: US 7,573,732 B2
(45) Date of Patent: Aug. 11, 2009

(54) PROTECTIVE CIRCUIT AND METHOD FOR MULTI-LEVEL CONVERTER

(75) Inventors: Ralph Teichmann, Albany, NY (US); Changyong Wang, Shanghai (CN); Robert William Delmerico, Clifton Park, NY (US); Zhuohui Tan, Shanghai (CN); Robert Roesner, Munich (DE); Renchang Dai, Beijing (CN)

(73) Assignee: General Electric Company, Niskayuna, NY (US)

( * ) Notice: Subject to any disclaimer, the term of this patent is extended or adjusted under 35 U.S.C. 154(b) by 159 days.

(21) Appl. No.: 11/753,794

(22) Filed: May 25, 2007

(65) Prior Publication Data

US 2008/0291708 A1    Nov. 27, 2008

(51) Int. Cl.
*H02H 7/122* (2006.01)
*H02M 5/458* (2006.01)

(52) U.S. Cl. .......................................... 363/51; 363/37
(58) Field of Classification Search ............. 363/34, 363/35, 37, 50, 55, 56.01, 56.02, 56.05, 95, 363/98, 132, 51; 361/111
See application file for complete search history.

(56) References Cited

U.S. PATENT DOCUMENTS 5,644,483 A * 7/1997 Peng et al. .................... 363/37

6,314,007 B2 * 11/2001 Johnson et al. ............... 363/37
6,392,907 B1 * 5/2002 Ichikawa ..................... 363/98

OTHER PUBLICATIONS

C. Kehl et al., "Design of a Propulsion Converter With High Voltage/High Current IGBT for Light Rail Vehicles," IGBT Propulsion Drives, IEE Colloquium, Apr. 25, 1995, pp. 6/1-6/10.
C. Newton et al., "Multi-Level Converters: A Real Solution to High Voltage Drives?," The Institute of Electrical Engineers, 1997, IEE, Savoy Place, London WC2R, 0BL UK, pp. 3/1-3/5.
C. Newton et al., "Multi-Level Convertors A Real Solution To Medium/High-Voltage Drives?," Power Engineering Journal, Feb. 1998, pp. 21-26.
C. Newton et al., "Novel Technique for Maintaining Balanced Internal DC Link Voltages in Diode Clamped Five-Level Inverters," IEE Proceedings, Electrical Power Application, vol. 146, No. 3, May 1999, pp. 341-349.
G. Scheuer et al., "Analysis of a 3-Level-VSI Neutral-Point-Control for Fundamental Frequency Modulated SVC-Applications," IEE, AC and DC Power Transmission, Conference Publication No. 423, Apr. 29-May 3, 1996, pp. 303-310.

(Continued)

*Primary Examiner*—Gary L Laxton
(74) *Attorney, Agent, or Firm*—Ann M. Agosti

(57) ABSTRACT

A protective circuit for a multi-level converter including a DC link capacitor bank includes: an energy absorbing element; switches, wherein at least two of the switches each couple the energy absorbing element to the capacitor bank; and a controller configured to provide control signals to the switches to selectively actuate the switches to enable control of energy dissipation and to enable control of voltage balance on the capacitor bank of the multi-level converter.

20 Claims, 8 Drawing Sheets

OTHER PUBLICATIONS

J. Steinke et al., "Switching Frequency Optimal PWM Control of a Three-Level Inverter," IEEE Transactions on Power Electronics, vol. 7, No. 3, Jul. 1992, pp. 487-496.

O. Pollakowski et al., "State-Space Analysis of Diode-Clamped Multi-Level Voltage Source Inverters for Static Var Compensation," EPE 1997, pp. 1582-1587.

J. K. Steinke, "Control of a Neutral-Point-Clamped PWM Inverter for High Power AC Traction Drives," Power Electronics and Variable-Speed Drives, Third International conference Jul. 13-15, 1998, pp. 214-217.

H. Weng et al., "Method, Apparatus and Computer Program Product for Injecting Current," U.S. Appl. No. 11/344,730, filed Jan. 31, 2006.

A. Ritter et al., "Systems and Methods for Balancing of DC Link in Three Level PWM Power Conversion Equipment," U.S. Appl. No. 11/535,954, filed Sep. 27, 2006.

\* cited by examiner

PROTECTIVE CIRCUIT AND METHOD FOR MULTI-LEVEL CONVERTER

BACKGROUND

The described embodiments relate generally to power converters.

Typically two-level power converters are used to convert wind turbine generated power into grid power. Two-level converters are cost effective at lower power levels. As power levels increase, a multi-level (herein meaning three or more) power converter embodiment is thought to be more cost effective.

One challenge for a three-level neutral point clamped converter topology is neutral point unbalance. For optimal operation of a typical three-level converter, the neutral point of the capacitor bank must be maintained at a voltage near the mid-point of the DC link. During normal operation, a three level converter pulse width modulation (PWM) strategy can be used to balance (center) the neutral point.

For PWM balance control, the basic principle is to inject an additional compensating signal during PWM modulation. By this technique, the neutral point current is regulated to charge or discharge the DC capacitors to compensate the capacitor voltage unbalance. Typical PWM balance control approaches include common mode signal injection using either carrier based modulation or space vector modulation.

During large grid disturbances, however, even when using PWM, the neutral point voltage may diverge away from the zero voltage potential. The neutral point voltage unbalance will increase voltage stress on the DC link capacitors and converter switches and result in a distorted output voltage waveform. For general-purpose applications such as motor drives, large grid disturbances will cause the converter to trip and thus avoid undue stress. However, wind turbines must be designed to ride-through large grid disturbances. Therefore, these conditions are of particular concern to wind turbine embodiments. In addition, any technique for balancing during these transient periods should be selected so as to minimize impact on output power quality and minimize component losses and stress.

BRIEF DESCRIPTION

Therefore, a protective circuit and method is needed to balance the DC link capacitor bank of a multi-level converter (meaning a converter having three or more levels) during conditions when PWM balance control is not sufficient. It would also be advantageous to combine this functionality within a circuit configured for energy dissipation or storage (such as a dynamic braking circuit, which is typically included within wind turbine applications).

Briefly, in accordance with one embodiment, a protective circuit for a multi-level converter including a DC link capacitor bank comprises: an energy absorbing element; switches, wherein at least two of the switches each couple the energy absorbing element to the capacitor bank; and a controller configured to provide control signals to the switches to selectively actuate the switches to enable control of energy dissipation and to enable control of voltage balance on the capacitor bank of the multi-level converter.

In accordance with another embodiment, a method is provided for energy dissipation control and voltage balance control for a multi-level converter including a DC link capacitor bank, an energy absorbing element, and protective switches with at least two of the protective switches each coupling the energy absorbing element to the capacitor bank. The method comprises providing control signals to the protective switches to selectively actuate the protective switches to enable control of energy dissipation and to enable control of voltage balance on the capacitor bank of the multi-level converter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
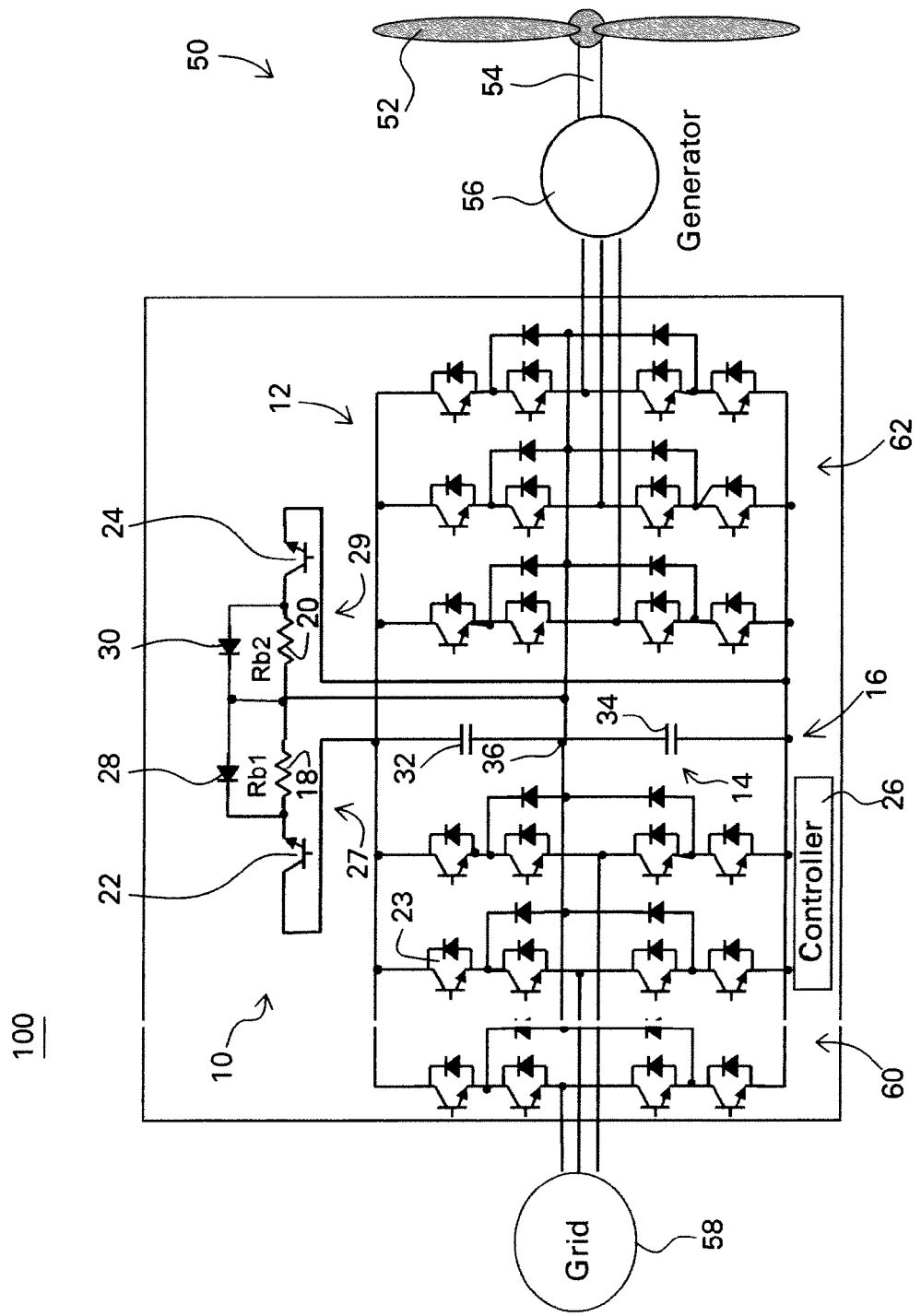
FIG. 1 is a diagram of a protective circuit for a multi-level converter in accordance with one embodiment.

FIG. 1 illustrates a wind turbine 50 embodiment for purposes of example. In a wind turbine, blades 52 are coupled to a shaft 54 which drives a generator 56, either directly or through a gearbox. The voltage resulting from generator 56 has a variable frequency that is converted to a fixed frequency by a converter system 12 before being supplied to a grid 58. For simplicity of illustration, conventional transformer and filter elements between the converter system and the grid are not shown in FIG. 1. Although a wind turbine generator is shown for purposes of example, any type of generator may be included with these embodiments being particularly useful for renewable energy source generators. Additionally, although a generator is shown in FIG. 1, as is further described with respect to FIG. 9, the embodiments disclosed herein are applicable to other types of loads such as motors in motor drives and a load bank in an uninterruptible power supply (UPS), for example.

As discussed above, a multi-level (herein meaning three or more) structure for a converter is useful for allowing operation at higher voltage levels than those available to two-level converters. FIG. 1 illustrates a three-level converter system 12 including a capacitor bank 14 with a neutral point 36, a grid side converter 60, and a machine or load side converter 62 (which is shown as a generator side converter in FIG. 1). For optimal operation, the same magnitude of voltage should be present on each side of neutral point 36 of the DC link 16 (that is, balanced). In the embodiment of FIG. 1, the same voltage magnitude should be present on each of capacitor 32 and capacitor 34. For a three-level converter, voltage balancing is commonly referred to as neutral point balancing.

Voltage balancing is typically achieved by pulse width modulation (PWM) on switches 23 of grid side converter 60 or switches in machine side converter 62. However, some applications experience transient conditions making PWM balancing a challenge.

In wind turbine embodiments, when the grid voltage is low or zero, PWM balancing of on the grid side converter is not effective and the neutral point may shift and result in overstress on DC capacitors and semiconductors, damage to power converter components, and generation of torque harmonics. The resulting torque harmonics may induce stress in mechanical components of wind turbine 50. Having a dynamic brake of the type described in commonly assigned Weng et al., U.S. application Ser. No. 11/344,730, filed 31 Jan. 2006, is useful for enabling low voltage ride through operation and for providing protection during turbine shut down circumstances. In one embodiment disclosed herein, a common energy absorbing element 18 (herein meaning at least one) is used both for energy absorption (dissipation or storage) and for balancing of the neutral point during stopping or low voltage conditions.

Another circumstance that is sometimes experienced in wind turbine embodiments is low power factor operation for the grid (sometimes referenced as static VAR mode). Low power factor typically occurs in low or no wind situations. Power dissipation or storage is not required in such circumstances. PWM balancing does not work in low power factor conditions. In one embodiment, energy absorbing element 18 is used for balancing under low power factor conditions.

More specifically, FIG. 1 illustrates a protective circuit 10 for a multi-level converter system 12 including a DC link 16 capacitor bank 14. Protective circuit 10 comprises an energy absorbing element (herein meaning at least one element and shown for purposes of example in FIG. 1 as including two elements 18 and 20). Protective circuit 10 further comprises switches (shown for purposes of example as two switches 22 and 24) with at least two of the switches each coupling energy absorbing element 18 to capacitor bank 14. A controller 26 is configured to provide control signals to switches 22 and 24 to selectively actuate switches 22 and 24 to enable control of energy dissipation and to enable control of neutral point balance on capacitor bank 14. These embodiments may be used within a power generation system 100.

Energy absorbing element 18 will typically comprise one or more resistors but may comprise any conventional or future developed element capable of storing or dissipating energy with several examples including batteries and ultracapacitors. Additionally, if desired, different combinations of energy absorbing elements may be used within a protective circuit.

The primary function of a protective circuit is to protect the DC bus from over voltage. However, by using the protective circuit topology shown in FIG. 1, for example, along with controller 26, the functionality can be enhanced to also provide neutral point voltage balancing support. In embodiment of FIG. 1, for example, two bridges 27 and 29 are used to modulate the voltage across DC capacitors 32 and 34 to maintain a zero average potential at the neutral (mid) point 36.

Using protective circuit 10 for neutral point balancing is expected to result in some energy loss and some stress on the DC capacitors due to charge and discharge cycling. Thus, it is recommended that PWM balancing be the primary balancing method and that the protective circuit be used for balancing when PWM balancing is not sufficient. In one embodiment, for example, controller 26 is configured for providing pulse width modulation control via actuation of converter switches 23 during normal operating conditions and for actuating protective circuit switches 22 and 24 during transient conditions. In a more specific embodiment, the transient conditions include low voltage, no voltage, and low power factor conditions of the type discussed above as well as under conditions wherein loads are light during start-up of a power generator.

In one more specific embodiment, as shown in FIG. 1, switch 22 and energy absorbing element 18 are coupled across capacitor 32, switch 24 and energy absorbing element 20 are coupled across capacitor 34, and protective circuit 10 includes two diodes 28 and 30 with diode 28 coupled in parallel with energy absorbing element 18 and diode 30 coupled in parallel with energy absorbing element 20. In the embodiment of FIG. 1, diodes 28 and 30 serve as reverse recovery diodes.

Switches 22 and 24 may each comprise any appropriate controllable switch with several examples including insulated gate bipolar transistors (IGBTs), gate communicated thyristors (GCTs), and metal oxide semiconductor field effect transistors (MOSFETs). In one embodiment, switches 22 and 24 are selected to be the same type of switches as switches 23 that are used in multi-level converter system 12. Embodiments for controlling switches 22 and 24 are discussed below with respect to FIGS. 2 and 3.

Figure 2:
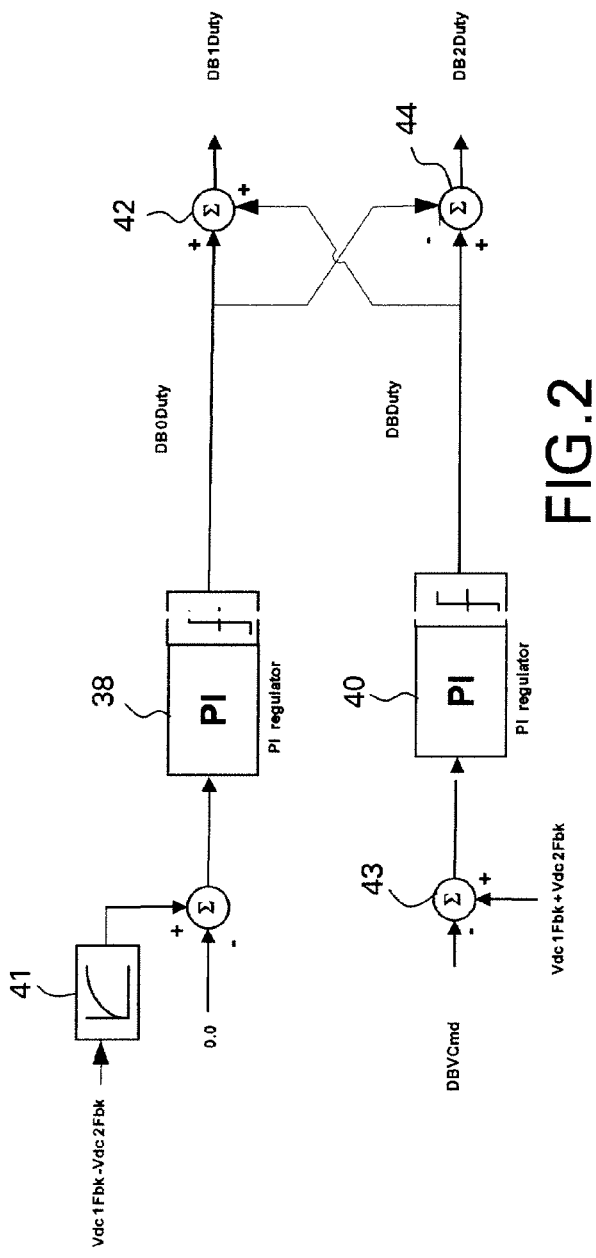
FIG. 2 is a diagram of a control diagram in accordance with one embodiment.

FIG. 2 is diagram of a control diagram in accordance with one embodiment for regulating the duty cycles of switches 22 and 24. The upper path of FIG. 2 generates the required duty cycle signal for neutral balancing support while the lower control path generates the duty cycle signal for over voltage protection. By combining the two signals, the duty cycle for each switch 22 and 24 can be determined. When the maximum DC link voltage is exceeded, the duty cycles will overlap and braking will occur. When one switch is on but the other is not, then the neutral point is adjusted and the balancing can occur.

More specifically, controller 26 is configured for obtaining an error signal representative of the voltage imbalance at neutral point 36 and using a neutral point regulator 38 to provide a neutral point command (DB0Duty) for driving the error signal towards zero. Controller 26, in this embodiment, is also configured for obtaining a signal representative of the combined voltage across the capacitor bank and using an over voltage regulator 40 to provide a voltage command (DBDuty) for maintaining the voltage within a threshold.

The voltage imbalance used by neutral point regulator 38 may be obtained in one embodiment by passing a signal representative of the difference between the two voltages across the capacitors through a noise filter 41 and feeding the signal (that is the neutral point error) through neutral point regulator 38. In one embodiment neutral point regulator 38 comprises a proportional integral (PI) regulator (to drive the neutral point error towards zero) combined with a limiter.

A difference element 43 can be used to obtain the difference between the combined voltage across the capacitor bank and a threshold voltage (DBVCmd). Voltage regulator 40 may comprise a proportional integral (PI) regulator (to drive the difference element 43 between combined voltage across the capacitor bank and the threshold voltage limit towards zero) combined with a limiter.

A summation element 42 of controller 26 obtains the sum of the neutral point and the voltage commands, and a difference element 44 obtains a difference of the voltage regulation and neutral point commands. The sum is used in controlling one of the switches, and the difference is used in controlling the other of the switches.

Figure 3:
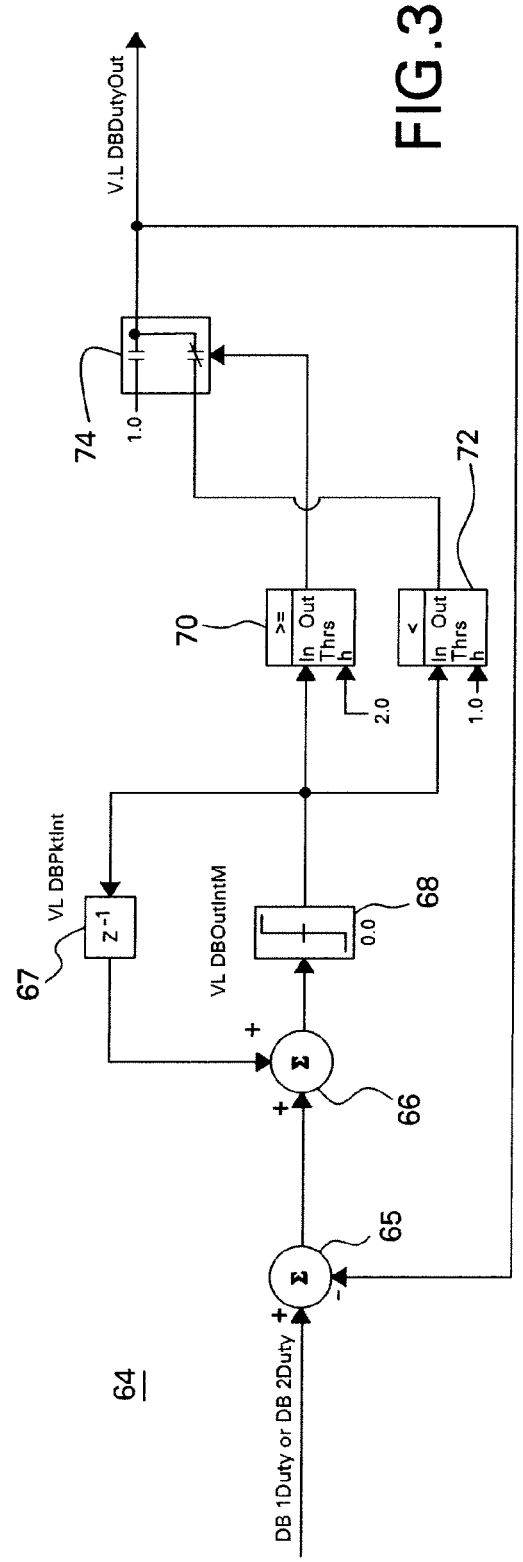
FIG. 3 is a diagram of a control diagram for use in addition to the embodiment shown in FIG. 2.

FIG. 3 is a diagram of a control diagram for use in addition to the diagram shown in FIG. 2. FIG. 3 illustrates a duty cycle modulator 64 which performs an "accumulate and truncate" function to be used for either of the output signals of the embodiment of FIG. 2 to control the on and off times of the respective switch.

In the embodiment of FIG. 3, difference element 65 provides the difference between the respective output signal of FIG. 2 (DB1Duty or DB2Duty) and an output signal of duty cycle modulator 64. The difference from element 65 is then integrated through summation element 66, limiter 68, and delay element (z-transform) 67.

Comparator 72 compares its input signal with a first threshold (in one example, 1). When its input is greater than the first threshold, the output of comparator 72 is a "1." Otherwise the output of comparator 72 is a "0."

Comparator 70 provides a signal when its input is greater than or equal to a second threshold (in one example, 2). When the input is greater than or equal to the second threshold, the output of comparator 70 is a "1." Otherwise the output of comparator 70 is a "0."

An on/off block 74 uses the comparator signals to provide the switching command. The output value of comparator 70 controls on/off block 74. The output of on/off block 74 is fixed at 1 if the output of comparator 70 is 1; otherwise on/off block 74 will convey the output of comparator 72. In other words, if the output of integrator 68 is higher than the first or second threshold, the duty cycle module will always result in an "on" command; if the output of integrator 68 is less than the first and second thresholds, the duty cycle module will result in an "off" command.

The embodiments of FIGS. 2 and 3 are most applicable for protective circuits including two switches, such as shown for purposes of example in FIGS. 1 and 4-6. Different control embodiments can similarly be developed, however, when additional switches are present.

Figure 4:
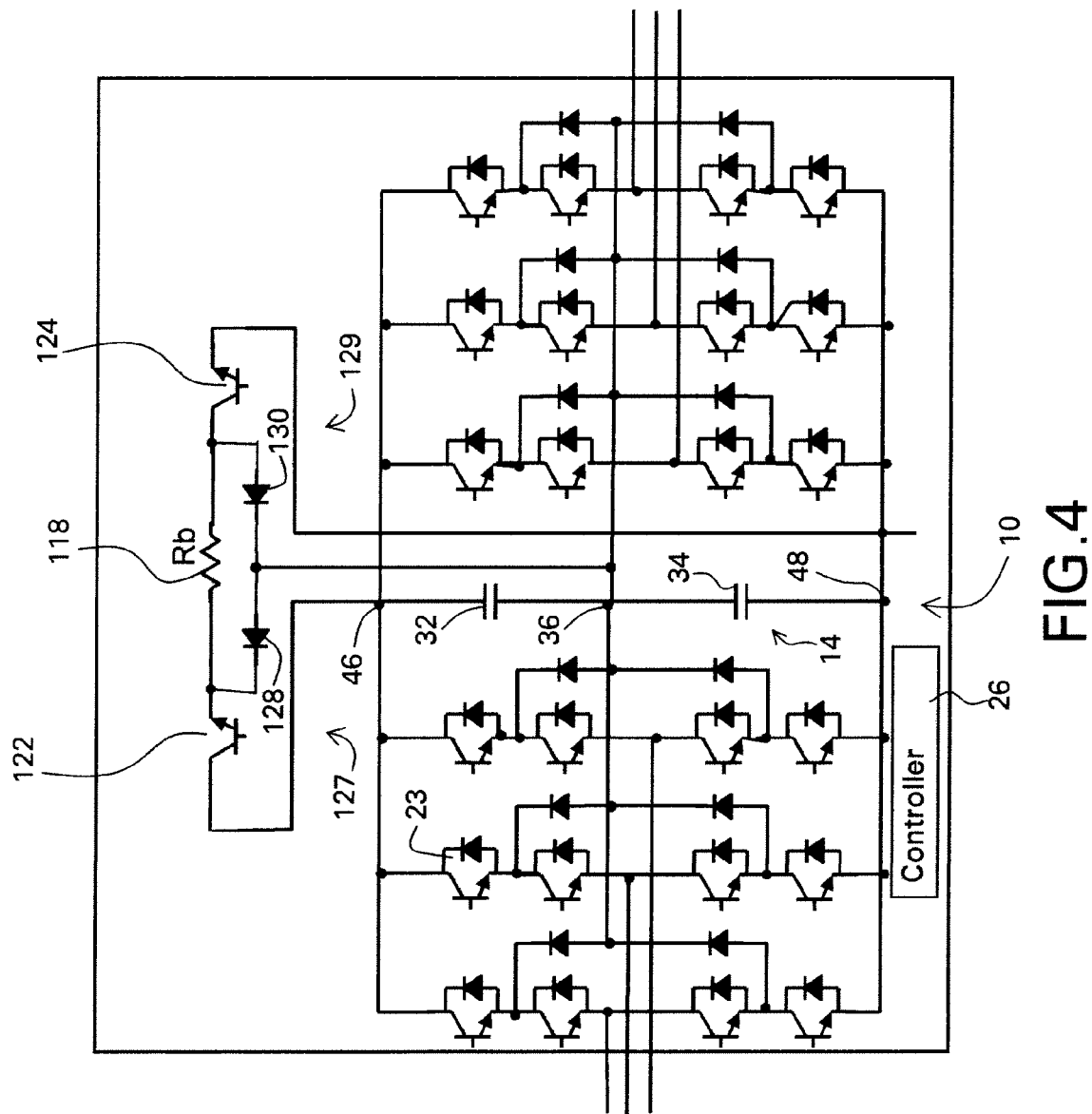
FIG. 4 is a diagram of a protective circuit for a multi-level converter in accordance with another embodiment.

FIG. 4 is a diagram of a protective circuit for a multi-level converter in accordance with another embodiment wherein protective circuit bridges 127 and 129 share a common energy absorbing element 118. Using a single energy absorbing element may simplify fabrication and provide a higher effective resistance during neutral point balancing. In the embodiment of FIG. 4, switch 122 is coupled to a positive rail 46 of the capacitor bank, switch 124 is coupled to a negative rail 48 of the capacitor bank, diodes 128 and 130 are coupled in series across energy absorbing element 118, and a connection point of the diodes is coupled to neutral point 36. In this embodiment, diodes 128 and 130 are useful in shaping the current paths. For example, the loop encompassing capacitor 32 includes positive rail 46, switch 122, energy absorbing element 118, diode 130, and neutral point 36. Similarly, the loop encompassing capacitor 34 includes neutral point 36, diode 128, energy absorbing element 118, switch 124, and negative rail 48.

Figure 5:
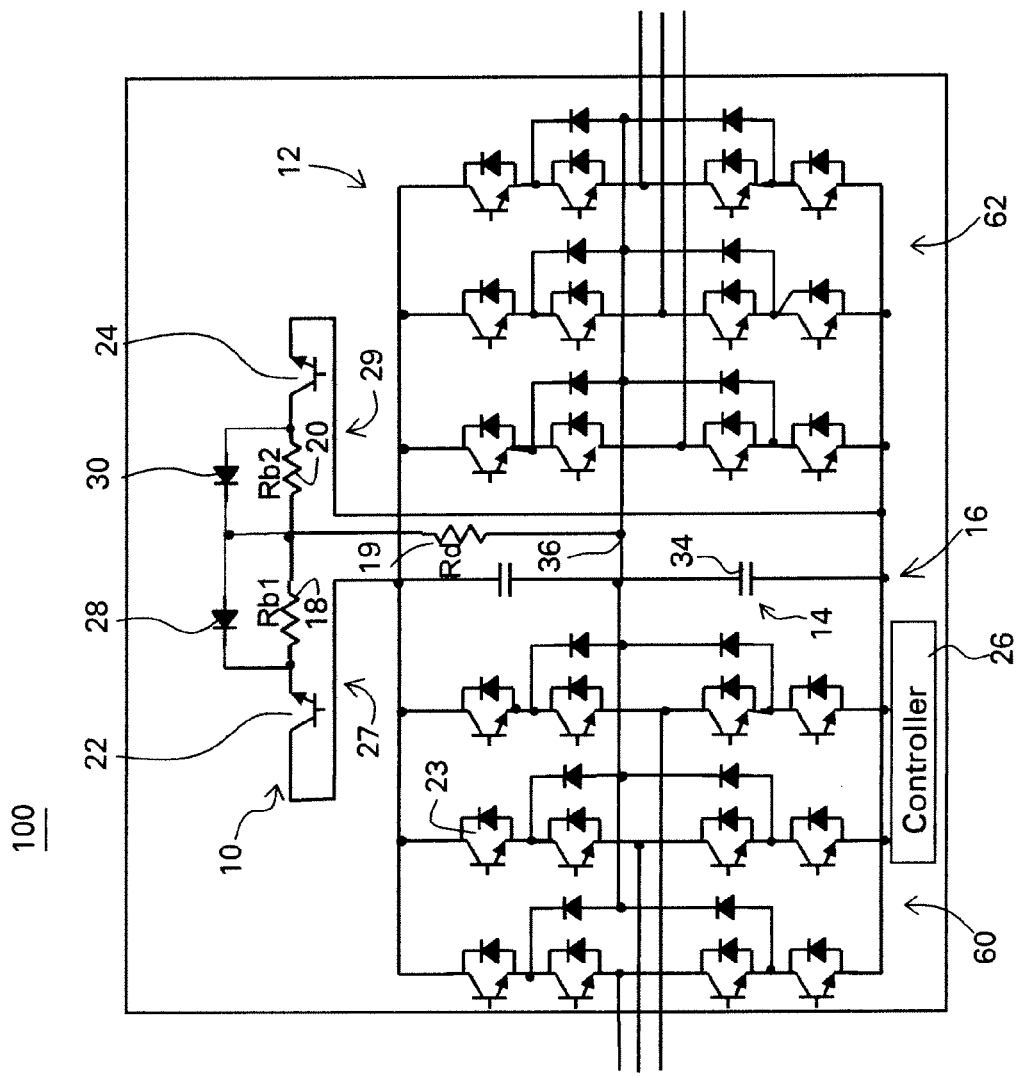
FIG. 5 is a diagram of a protective circuit for a multi-level converter in accordance with another embodiment.

FIG. 5 is a diagram of a protective circuit for a multi-level converter in accordance with an embodiment similar to that of FIG. 1 with the addition of resistor 19 which has a smaller rating than energy absorbing element 18 or energy absorbing element 20 and is coupled to neutral point 36. A similar resistor 19 may be used in the embodiments of FIG. 4 and FIG. 6 if desired.

When resistors are used in protective circuit 10, the resistance value of elements 18 and 20 is typically small (because large rating resistors are useful for voltage protection) such that balancing control can be a challenge, and ripple current stress on the capacitors may increase. Adding an extra resistor with a higher resistance (smaller rating) is useful to assist in neutral point balancing without affecting the total voltage across the capacitor bank.

Figure 6:
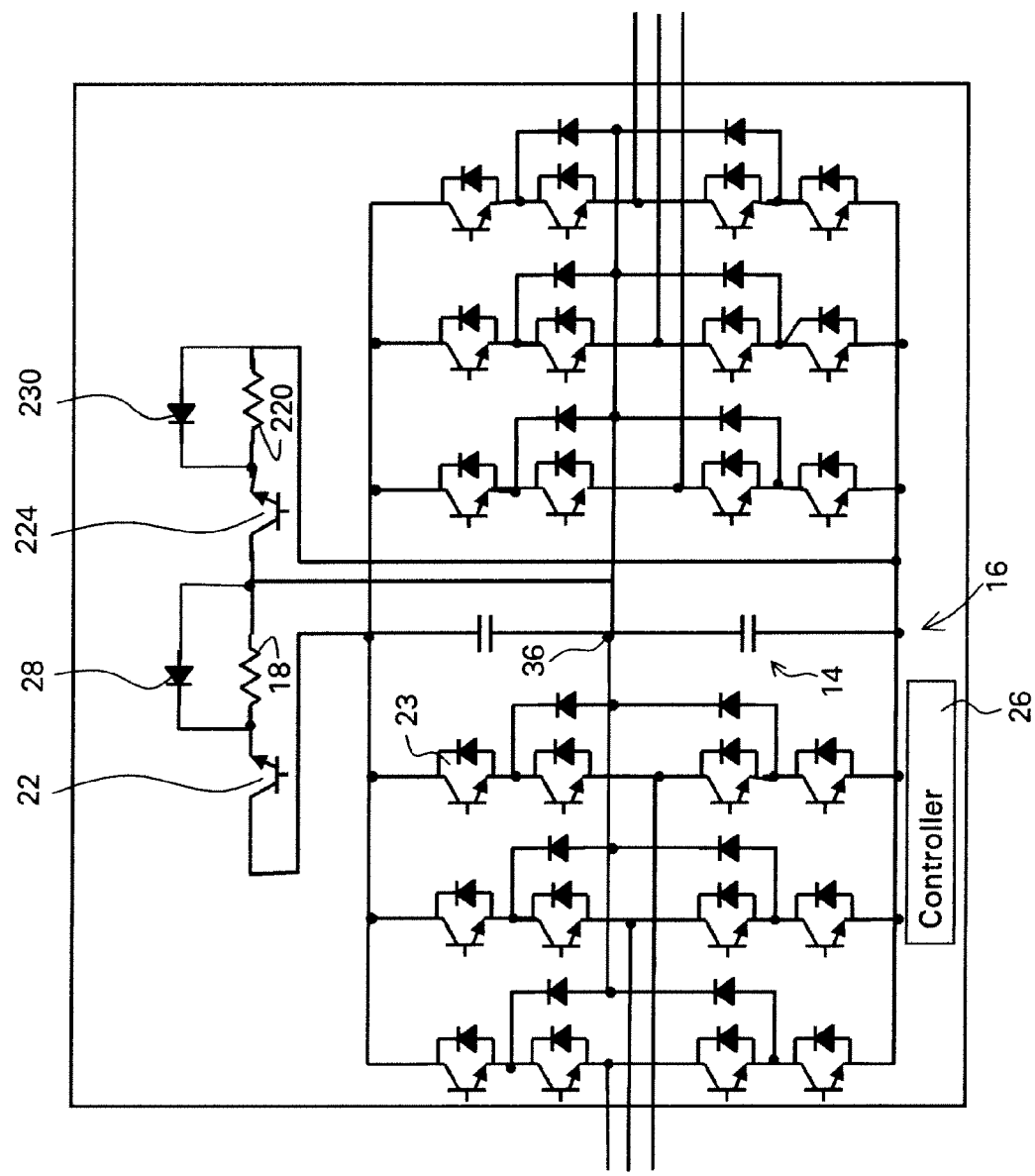
FIG. 6 is a diagram of a protective circuit for a multi-level converter in accordance with another embodiment.

FIG. 6 is a diagram of a protective circuit for a multi-level converter in accordance with another embodiment. The embodiment of FIG. 6 is similar to that of FIG. 1 except for the reversal of positions of switch 224 and the pair of energy absorbing element 220 and diode 230.

Figure 7:
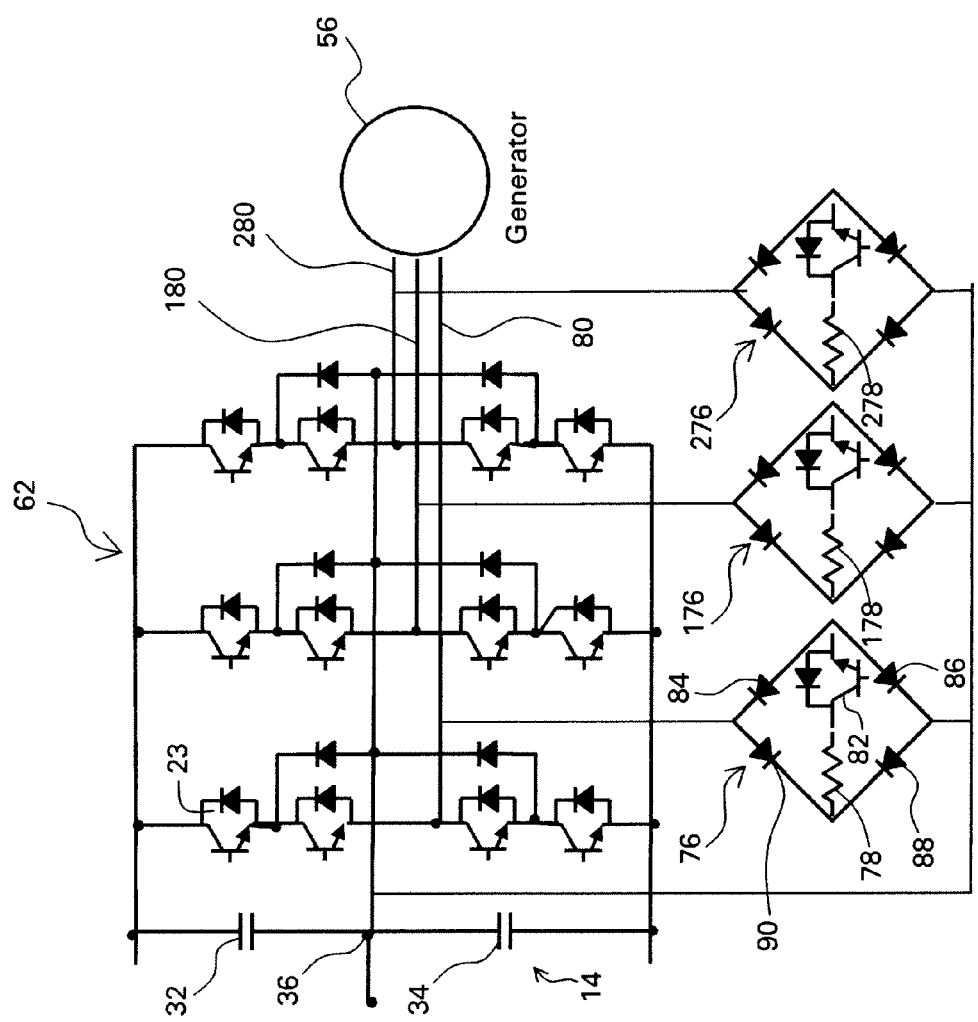
FIG. 7 is a diagram of a protective circuit for a multi-level converter in accordance with another embodiment.

FIG. 7 is a diagram of a protective circuit for a multi-level converter in accordance with another embodiment wherein the energy absorbing elements are coupled to machine side converter phase legs. More specifically, in the embodiment of FIG. 7, the switches comprise at least three switches, and the energy absorbing element comprises at least three energy absorbing elements. A first one of the switches 76 and a first one of the energy absorbing elements 78 are coupled between a first phase leg 80 of machine side converter 62 and neutral point 36 of capacitor bank 14, a second one of the switches 176 and a second one of the energy absorbing elements 178 are coupled between a second phase leg 180 and the neutral point, and a third one of the switches 276 and a third one of the energy absorbing elements 278 are coupled between a third phase leg 280 and the neutral point.

In the illustrated embodiment, bidirectional switches are used, and each bidirectional switch include includes one switching element 82 and four steering diodes 84, 86, 88, and 90. Having the switches and energy absorbing elements coupled to phase legs 80, 180, 280 permits absorbing energy from the generator, whereas adding the connections to neutral point 36 permits balancing (charging and discharging capacitors 32 and 34).

Figure 8:
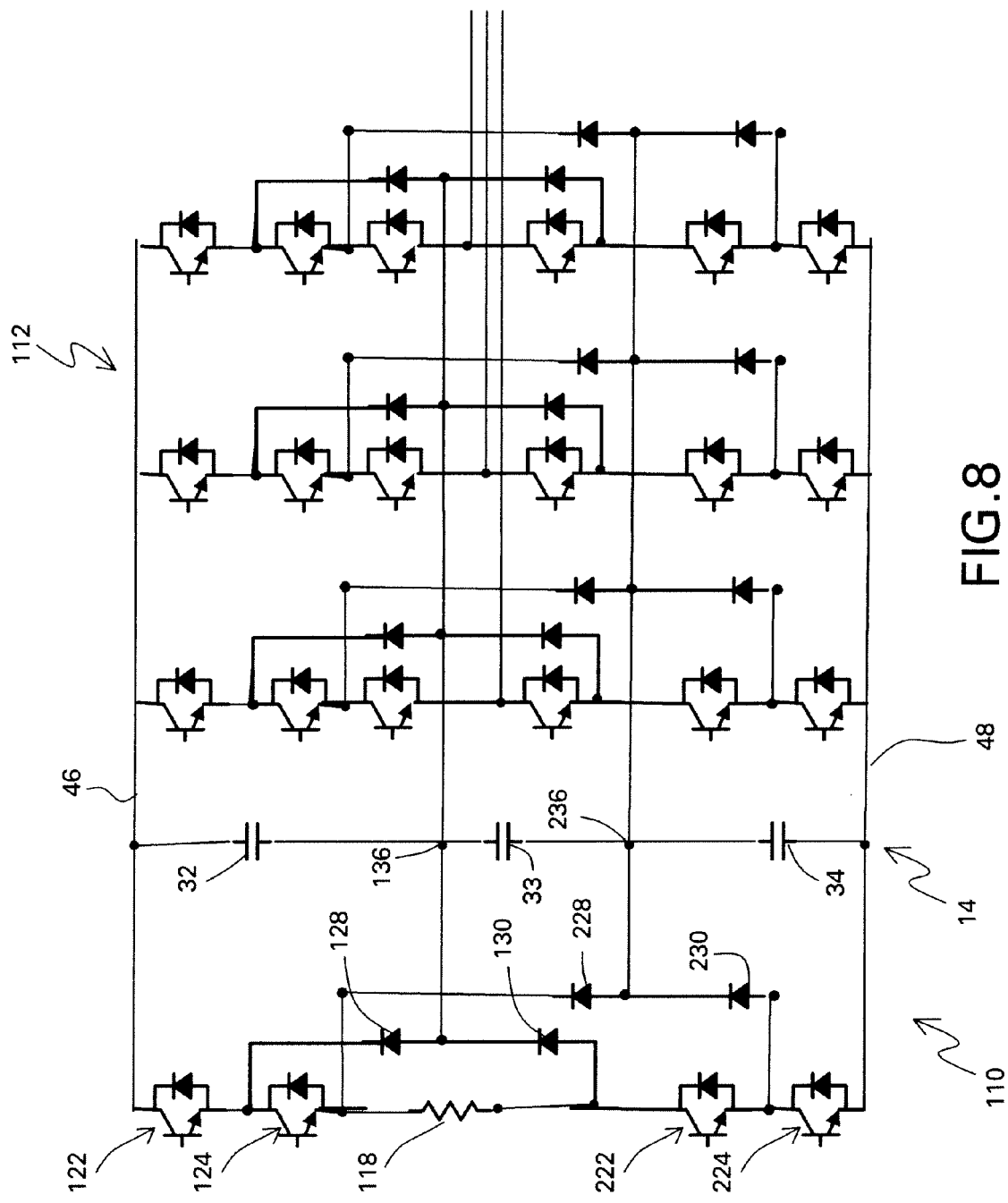
FIG. 8 is a diagram of a protective circuit for a multi-level converter in accordance with another embodiment.

FIG. 8 is a diagram of a protective circuit 110 for a multi-level converter in accordance with another embodiment wherein a four level converter system 112 is used. A four level converter includes a capacitor bank 14 with capacitors 32, 33, 34 and mid-level voltage points 136 and 236. Proper operation of the converter requires that the voltage across the capacitors be balanced. The high level principles of operation of a four level converter are the same as a three level converter but the control embodiments are more complex due to the higher numbers of switches and energy absorbing elements. For example, by operating switches 122 and 124 with diode 130 mid-level point 136 will move towards the positive rail 46. Conversely, by operating switches 124, 222, and 224 with diode 128 mid-level point 136 will move towards the negative rail 48. Similarly, by operating switches 222 and 224 with diode 228 mid-level point 236 will move towards the negative rail 48, while operating switches 122, 124, and 222 with diode 230 mid-level point 236 will move towards the positive rail 46. In addition, operation of switches 122, 124, 222, and 224 can be used to discharge the DC link. By coordinating the operation of these switch groups, capacitor voltage balance can be maintained.

Figure 9:
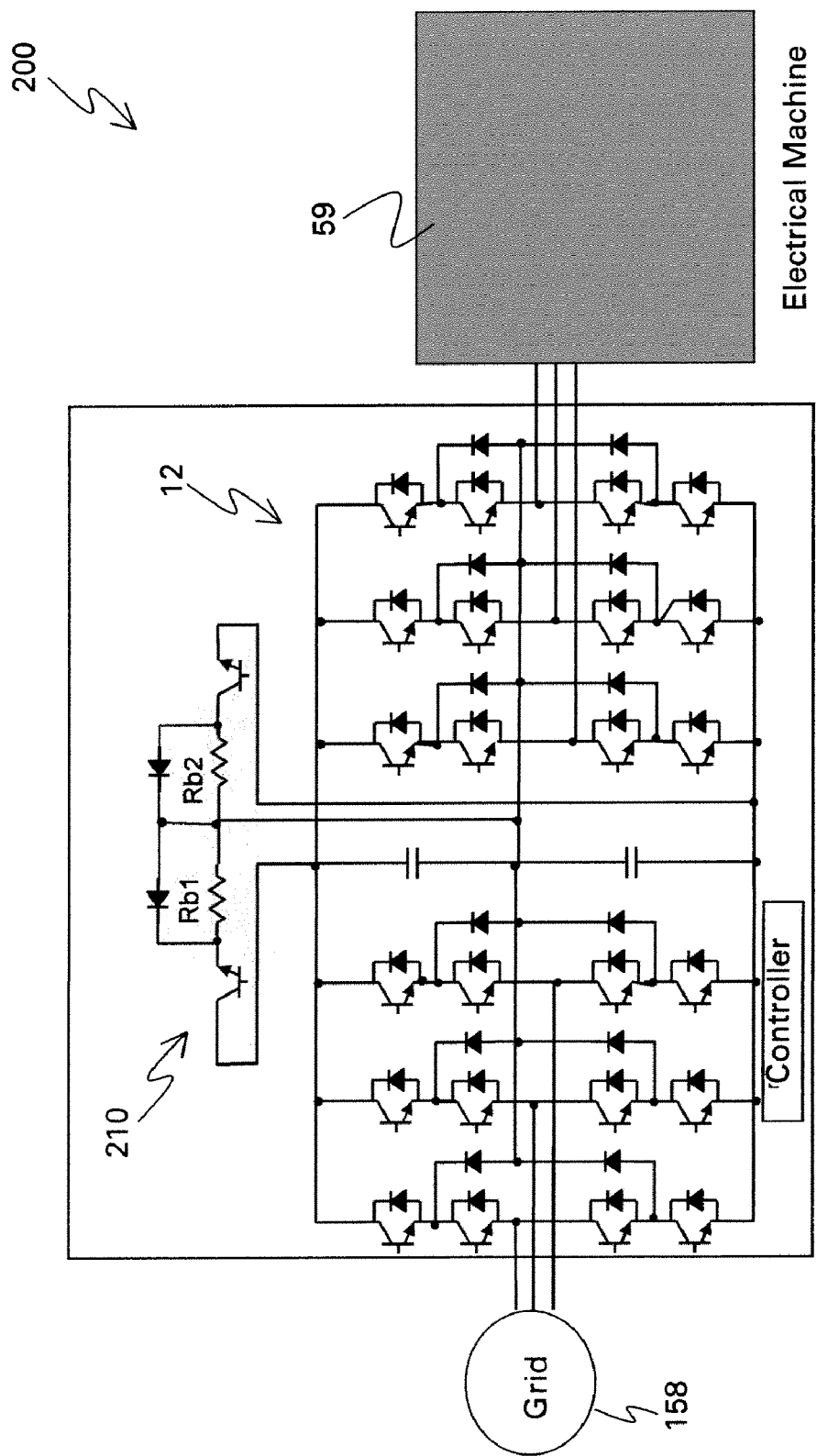
FIG. 9 is a diagram of a protective circuit for a multi-level converter for another embodiment.

FIG. 9 is a diagram of a power conversion system 200 including a protective circuit 210 similar to that if FIG. 1 for a multi-level converter in accordance with another embodiment wherein power is being supplied from a grid 158 to an electrical machine 59 (herein meaning at least one electrical machine). In a more specific embodiment, the electrical machine comprises a motor incorporated in an assembly for obtaining oil, gas, or combinations thereof. Typically such motors are coupled to compressors (not shown) which are used to operate drilling equipment. In oil and gas applications wherein power is distributed to a number of off shore motors from the grid, balancing can be a challenge under light load and low power factor conditions and thus the above-described embodiments are useful.

A number of specific embodiments are described above and such embodiments can be combined and used in any desired manner. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A protective circuit for a multi-level converter including a DC link capacitor bank, the protective circuit comprising:
   an energy absorbing element;
   switches, wherein at least two of the switches each couple the energy absorbing element to at least one mid-point of the capacitor bank, the at least one mid-point at a floating potential between a positive voltage rail and a negative voltage rail; and
   a controller configured to provide control signals to the switches to selectively actuate the switches to enable control of energy dissipation and to enable control of voltage balance on the capacitor bank of the multi-level converter during transient conditions, and further configured to provide control signals to multi-phase converter phase leg switches during normal operating conditions.

2. The protective circuit of claim 1 wherein the energy absorbing unit comprises an element selected from the group consisting of resistors, batteries, ultracapacitors, and combinations thereof.

3. The protective circuit of claim 1 wherein the controller is configured for providing pulse width modulation control during normal operating conditions and for actuating the switches during transient conditions.

4. The protective circuit of claim 3 wherein the transient conditions include low voltage, no voltage, low power factor conditions, and power generation start-up under light load conditions.

5. The protective circuit of claim 3 wherein the transient conditions include low voltage, no voltage, and low power factor conditions, and power generation start-up under light load conditions.

6. The protective circuit of claim 1 wherein the converter comprises a three level converter.

7. The protective circuit of claim 6, further comprising two diodes, wherein the energy absorbing element comprises at least two energy absorbing elements, wherein the capacitor bank comprises at least two capacitors, and wherein
   a first one of the switches and a first one of the energy absorbing elements are coupled across a first capacitor,
   a second one of the switches and a second one of the energy absorbing elements are coupled across a second capacitor,
   a first one of the diodes is coupled in parallel to the first energy absorbing element, and
   a second one of the diodes is coupled in parallel to the second energy absorbing element.

8. The protective circuit of claim 7 wherein the controller is configured for obtaining an error signal representative of the voltage imbalance at a neutral point of the capacitor bank, using a neutral point regulator to provide a neutral point command for driving the error signal towards zero, obtaining a signal representative of the combined voltage across the capacitor bank, using an over voltage regulator to provide a voltage command for maintaining the voltage within a threshold.

9. The protective circuit of claim 8 wherein the controller further comprises a summation element for obtaining the sum of the neutral point command and the voltage command, and a difference element for obtaining a difference of the voltage command and the neutral point command.

10. The protective circuit of claim 6, further comprising two diodes, wherein the capacitor bank comprises at least two capacitors and wherein
    a first one of the switches is coupled to one side of the capacitor bank,
    a second one of the switches is coupled to the other side of the capacitor bank,
    the diodes are coupled in series across the energy absorbing element, and
    a connection point of the diodes is coupled to a neutral point of the capacitor bank.

11. The protective circuit of claim 6 wherein the switches comprise at least three switches, wherein the energy absorbing element comprises at least three energy absorbing elements, and wherein
    a first one of the switches and a first one of the energy absorbing elements are coupled between a first phase leg of a machine side converter and a neutral point of the capacitor bank,
    a second one of the switches and a second one of the energy absorbing elements are coupled between a second leg of the machine side converter and the neutral point of the capacitor bank, and
    a third one of the switches and a third one of the energy absorbing elements are coupled between a third phase leg of the machine side converter and the neutral point of the capacitor bank.

12. The protective circuit of claim 1 wherein the energy absorbing element comprises at least two energy absorbing elements with at least one of the energy absorbing elements having a smaller rating than another of the energy absorbing elements and being coupled to a neutral point of the capacitor bank.

13. A power generation system comprising:
    a multi-level converter, wherein the multi-level converter comprises a DC link capacitor bank; and
    a protective circuit, wherein protective circuit comprises:
    an energy absorbing element;
    switches, wherein at least two of the switches each couple the energy absorbing element to at least one mid-point of the capacitor bank, the at least one mid-point at a floating potential between a positive voltage rail and a negative voltage rail; and
    a controller configured to provide control signals to the switches to selectively actuate the switches to enable control of energy dissipation and to enable control of voltage balance on the capacitor bank of the multi-level converter during transient conditions, and further configured to provide control signals to multi-phase converter phase leg switches during normal operating conditions.

14. The power generation system of claim 13 further comprising a wind turbine generator coupled to the multi-level converter.

15. The power generation system of claim 13 further comprising a renewable energy source generator coupled to the multi-level converter.

16. The power generation system of claim 13 further comprising a machine coupled to the multi-level converter.

17. The power generation system of claim 16 wherein the machine comprises a motor.

18. The power generation system of claim 17 wherein the motor comprises a motor incorporated in an assembly for obtaining oil, gas, or combinations thereof.

19. A method for providing energy dissipation control and voltage balance control for a multi-level converter including a DC link capacitor bank comprising at least one mid-point at a floating potential between a positive voltage rail and a negative voltage rail, an energy absorbing element, and protective switches, wherein at least two of the protective switches each couple the energy absorbing element to the capacitor bank, the method comprising:

proventioning control signals to the protective switches to selectively actuate the protective switches to enable control of energy dissipation and to enable control of voltage balance on the capacitor bank of the multi-level converter during transient conditions; and providing control signals to multi-phase converter phase leg switches during normal operating conditions.

20. The method of claim 19 wherein providing control signals comprises providing pulse width modulation control signals to phases leg switches of the multi-level converter during normal operating conditions and providing control signals for actuating the protective switches during transient conditions.

* * * * *